G. JOHNSTON.
RAIL SAW.
APPLICATION FILED FEB. 19, 1915.
1,232,042.
Patented July 3, 1917.
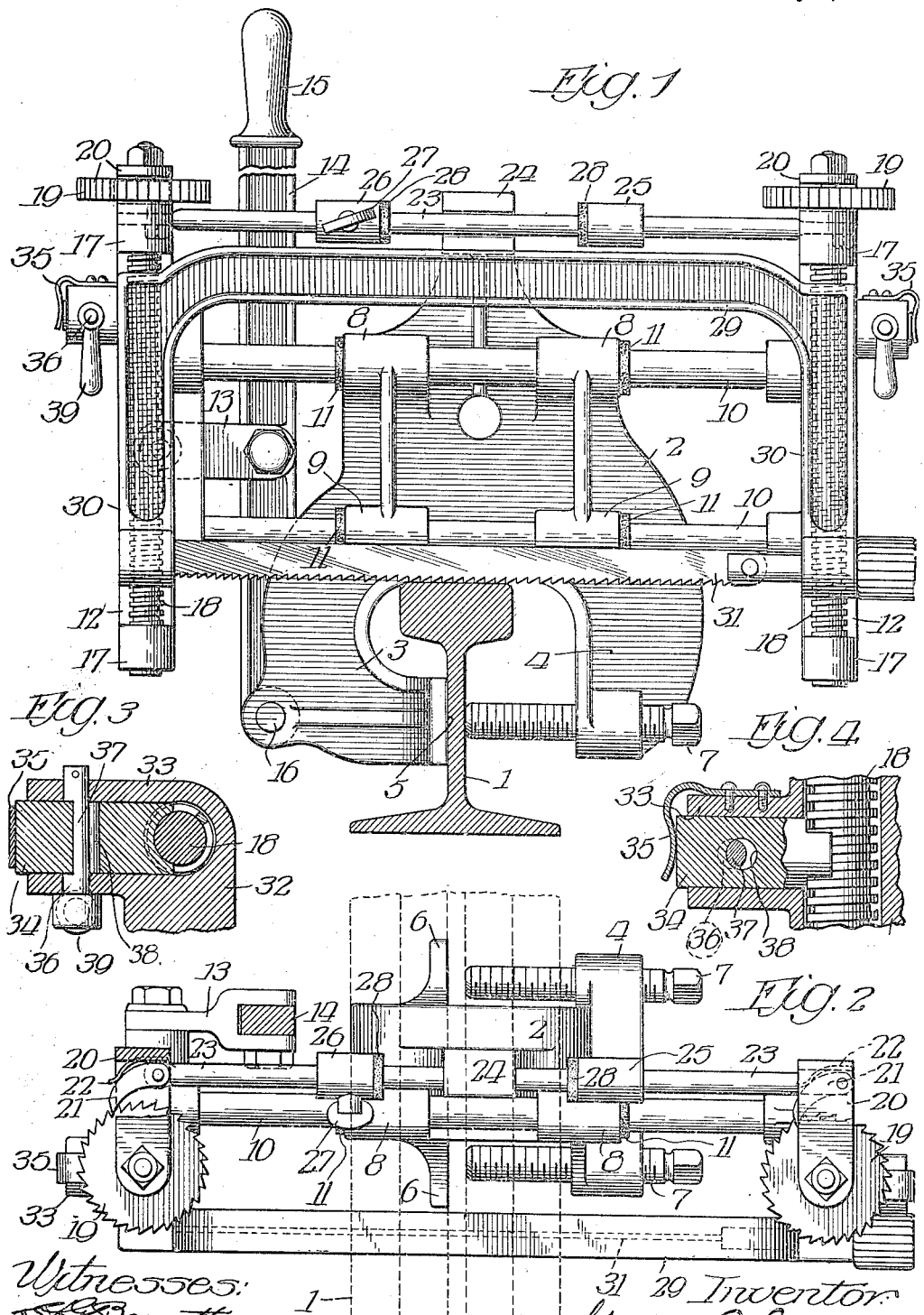

UNITED STATES PATENT OFFICE.

GUSTAVE JOHNSTON, OF CHICAGO, ILLINOIS.

RAIL-SAW.

1,232,042.  Specification of Letters Patent.  Patented July 3, 1917.

Application filed February 19, 1915. Serial No. 9,245.

*To all whom it may concern:*

Be it known that I, GUSTAVE JOHNSTON, a citizen of the United States, residing in Chicago, in the county of Cook and State of Illinois, have invented certain new and useful Improvements in Rail-Saws, of which the following is a specification.

My invention relates in general to saws and more particularly to saws used in cutting metallic objects, such as steel rails, I-beams, channel irons and the like, and has for its object broadly the provision of a holder and operating mechanism which will hold and guide the saw throughout its operation, insuring perfect and accurate work and adding materially to the effective life of the saw blade.

In a patent granted to me on August 4, 1914, No. 1,105,794, I have described a rail saw of the general character of my present invention, which constitutes an improvement over the rail saw described in my prior patent.

One of the objects of my present invention is to provide a rail saw in which both ends of the saw are simultaneously and positively fed in a vertical direction at each reciprocation thereof, whereby the action of the saw is made more rapid.

A further object of my invention is to provide means whereby the amount of movement of the saw during the feeding operation may be varied by the operator to accommodate the varying hardness of the material to be treated.

Other objects and advantages of my invention will be apparent as it is better understood from the following description when read in connection with the accompanying drawing in which—

Figure 1 is a side elevation of a rail saw according to my invention;

Fig. 2 is a plan view of the device, as shown in Fig. 1;

Fig. 3 is a detail in horizontal section of the means on the saw coöperating with the feeding screws, and Fig. 4 is a detail in vertical section of the mechanism shown in Fig. 3.

Referring to the drawing, 1 indicates a rail and is intended to illustrate any metallic object of a similar character, which it is desired to cut. A support 2 is provided with a clamping member comprising the downwardly extending arms 3 and 4, the arm 3 terminating in a plane-engaging surface 5, formed by the oppositely disposed lugs 6 and the end of the arm, and the arm 4 being provided with a plurality of set screws 7 threadedly mounted therein. The set screws 7 are adapted to be screwed inwardly to firmly clamp the object to be sawed against the plane surface 5 of the arm 3.

The support 2 is provided adjacent its top with a pair of alined bearings 8, beneath which are located a similar pair of alined bearings 9, the bearings being adapted to slidably support the rods 10 of the reciprocating frame. Cushions 11 are provided at the outer faces of the bearings 8 and 9 to prevent shocks as the frame is reciprocated. Supported on the opposite ends of the rods 10 are the vertical members 12, one of which is connected by a link 13 to a lever 14 pivotally mounted at 16 on the support 2 and provided with a handle 15. By operating the lever 14 the frame may be reciprocated, the rods 10 sliding in the bearings 8 and 9.

The vertical members 12 are provided at either end with lugs 17 in which the feed screws 18 are rotatably supported. To the upper ends of the screws 18 the ratchet wheels 19 are secured and yokes 20 are disposed about the ratchets 19 and pivotally mounted on the ends of the screws 18. A pawl 21 is pivotally mounted in each of the yokes 20 and normally forced into engagement with the teeth of the ratchet wheels 19 by the springs 22 secured to the yokes 20. A rod 23 is secured at either end to the yokes 20 and passes through a bearing 24 formed in an upward extension of the support 2. A pair of abutments 25 and 26 are secured to the rod 23, one of the abutments, in this instance, being adjustable by means of a clamping screw 27. The abutments 25 and 26 are provided with cushions 28. The bearing 24 provides a fixed abutment against which the abutments 25 and 26 engage as the frame is reciprocated and it will be readily understood that as the frame moves to the left, viewing Figs. 1 and 2 of the drawing, as soon as the abutment 25 engages the bearing 24 the pawls 21 will be drawn backwardly over the teeth of the ratchet wheels 19 and upon movement in the opposite direction as soon as the abutment 26 engages the bearing 24 the ratchet wheels 19 will be forced forwardly by pawls 21. By varying the distance between the abutment 26 and the bearing 24 the amount of movement given to the ratchet wheels 19 may be regulated as desired.

The saw comprises a frame 29 having end portions 30 and a blade 31 suitably mounted between the end portions. The end portions 30 have rearward extensions 32 adapted to loosely surround the feed screws 18. Near their upper extremities the extensions 32 are provided with lateral extensions 33 forming supports for the members 34, one end of each of which is threaded and adapted to partially surround one of the feed screws 18. The members 34 are slidably mounted in the extensions 33 and are normally held in their innermost position with their ends in engagement with the feed screws 18 by springs 35 suitably secured to the extensions 33. In order that the saw may be released from the feed screws 18 to adjust it, I mount the shafts 36 in the extensions 33 and provide the eccentrics 37 thereon, which engage in openings 38 in the members 34. An operating handle 39 is mounted on each of the shafts 36 and, as will be readily understood, when the shafts 36 are turned by means of the operating handles 39 the eccentrics 37 will force the members 34 rearwardly out of engagement with the feed screws 18 and the saw will thereby be released from the feed screws and may be moved to any desired position.

The operation of my device will, it is believed, be apparent without further description of the structure thereof. When the support has been clamped in position on the member to be sawed the handles 39 are operated to release the saw, the saw is lowered until it engages with the surface of the object to be sawed and the members 34 are released to again connect the saw with the feed screws 18. The frame is then reciprocated by actuating the lever 14 and at each reciprocation both ends of the saw are simultaneously and positively moved vertically a definite distance, depending on the position of the abutment 26, to maintain the saw blade 31 in proper relation with the work. This definite vertical movement continues until the sawing operation is completed. Should it be found that the vertical movement is greater or smaller than desired it may be varied at will by loosening the abutment 26 and securing it in a new position, it being understood that as the abutment 26 is moved toward or from the bearing 24 more or less throw is given to the pawls 21 and the saw is moved a correspondingly greater or smaller distance in a vertical direction by the feed screws 18.

It will be obvious, moreover, that various changes may be made in the minor details of construction, the arrangement of parts and the form of the said parts without departing from the spirit and scope of my invention as defined in the claims or sacrificing any of its advantages, the form hereinbefore disclosed being merely one preferred embodiment thereof.

I claim:

1. In a rail saw, the combination of a support adapted to be secured to a rail, a frame mounted to reciprocate thereon, a saw carried by said frame, means for reciprocating said frame, and automatic means including a member reciprocable conjointly with and relatively to said frame and operatively connected to both ends of said saw to intermittently, simultaneously and positively feed said ends a definite distance in a vertical direction at each reciprocation thereof.

2. In a rail saw, the combination of a support adapted to be secured to a rail, a frame mounted to reciprocate thereon, a saw carried by said frame, means for reciprocating said frame, means including a member reciprocable conjointly with and relatively to said frame and operatively connected to both ends of said saw to intermittently, simultaneously and positively feed said ends a definite distance in a vertical direction at each reciprocation thereof, and means for adjusting said feeding means to vary the amount of feeding movement.

3. In a rail saw, the combination of a support adapted to be secured to a rail, a frame mounted to reciprocate thereon, a saw carried by said frame, means for reciprocating said frame, means at each end of said frame operatively connected to the adjacent ends of said saw to positively feed said saw a definite distance in a vertical direction, and means to intermittently and automatically actuate said feeding means at each reciprocation of said frame including a member reciprocable conjointly with and relatively to said frame.

4. In a rail saw, the combination of a support adapted to be secured to a rail, a frame mounted to reciprocate thereon, a saw carried by said frame, means for reciprocating said frame, means at each end of said frame operatively connected to the adjacent end of said saw to positively feed said saw a definite distance in a vertical direction, means for actuating said feeding means including a member reciprocable conjointly with and relatively to said frame, and adjustable means to automatically cause said member to reciprocate relatively to said frame at each reciprocation of the latter.

5. In a rail saw, the combination of a support adapted to be secured to a rail, a frame mounted to reciprocate thereon, a saw carried by said frame, means for reciprocating said frame, means at each end of said frame operatively connected to the adjacent end of said saw to positively feed said saw a definite distance in a vertical direction, adjustable means to intermittently and automatically actuate said feeding means including a member reciprocable conjointly with and relatively to said frame, and means for releasing said saw from said feeding means.

6. In a rail saw, the combination of a support adapted to be secured to a rail, a frame mounted to reciprocate thereon, a saw carried by said frame, means for reciprocating said frame, a plurality of screws mounted in said frame, threaded means on said saw adapted to engage said screws, resilient means to normally hold said threaded means in engagement with said screws, manually operable means to move said threaded means out of engagement with said screws, and means for intermittently and automatically actuating said screws to simultaneously and positively feed both ends of said saw a definite distance in a vertical direction at each reciprocation of said frame including a member reciprocable conjointly with and relatively to said frame.

7. In a rail saw, the combination of a support adapted to be secured to a rail, a frame mounted to reciprocate thereon, a saw carried by said frame, means for reciprocating said frame, a plurality of screws mounted in said frame, threaded means on said saw adapted to engage said screws, springs to normally hold said threaded means in engagement with said screws, manually operable cams to move said threaded means out of engagement with said screws, and means for intermittently and automatically actuating said screws to simultaneously and positively feed both ends of said saw a definite distance in a vertical direction at each reciprocation of said frame including a member reciprocable conjointly with and relatively to said frame.

8. In a rail saw, the combination of a support adapted to be secured to a rail, a frame mounted to reciprocate thereon, a saw carried by said frame, means for reciprocating said frame, a plurality of screws mounted in said frame, threaded means on said saw adapted to engage said screws, ratchet wheels secured to said screws, and adjustable means including a member reciprocable conjointly with and relatively to said frame for intermittently actuating said ratchet wheels whereby each end of said saw is simultaneously and positively fed a definite distance in a vertical direction at each reciprocation of said frame.

9. In a rail saw, the combination of a support adapted to be secured to a rail, a frame mounted to reciprocate thereon, a saw carried by said frame, means for reciprocating said frame, a screw mounted in said frame at each end of said saw, means on said saw to engage said screws, ratchet wheels secured to said screws, and means including a fixed abutment on said support and a member reciprocable conjointly with and relatively to said frame for intermittently actuating said ratchet wheels whereby each end of said saw is simultaneously and positively fed a definite distance in a vertical direction at each reciprocation of said frame.

10. In a rail saw, the combination of a support adapted to be secured to the rail, a frame mounted to reciprocate thereon, a saw carried by said frame, means for reciprocating said frame, a screw mounted in said frame at each end of said saw, threaded means on said saw movable into and out of engagement with said screws, and automatic means for intermittently actuating said screws to simultaneously and positively feed both ends of said saw a definite distance in a vertical direction at each reciprocation of said frame including a member reciprocable conjointly with and relatively to said frame, abutments on said member and a fixed abutment on said support adapted to coöperate with the abutments on said member.

11. In a rail saw, the combination of a support adapted to be secured to the rail, a frame mounted to reciprocate thereon, a saw carried by said frame, means for reciprocating said frame, a screw rotatably mounted in said frame adjacent each end of said saw, threaded means on said saw adapted to engage said screws, ratchet wheels secured to said screws, yokes pivotally connected to said screws, pawls carried by said yokes and engaging said ratchet wheels, a rod secured at either end to said yokes, a fixed abutment on said support, and abutments on said rod adapted to alternately engage the abutment on said support as said frame is reciprocated to actuate said ratchet wheels and screws and thereby simultaneously and positively feed said saw a definite distance in a vertical direction at each reciprocation of said frame.

12. In a rail saw, the combination of a support adapted to be secured to the rail, a frame mounted to reciprocate thereon, a saw carried by said frame, means for reciprocating said frame, a screw rotatably mounted in said frame adjacent each end of said saw, threaded means on said saw adapted to engage said screws, ratchet wheels secured to said screws, yokes pivotally connected to said screws, pawls carried by said yokes and engaging said ratchet wheels, a rod secured at either end to said yokes, a fixed abutment on said support, abutments on said rod adapted to alternately engage the abutment on said support as said frame is reciprocated to actuate said ratchet wheels and screws and thereby simultaneously and positively feed said saw a definite distance in a vertical direction at each reciprocation of said frame, and means for adjustably securing one of said abutments to said rod to vary the feeding movement.

GUSTAVE JOHNSTON.

Witnesses:
ED. K. ROE,
WM. O. BELT.